United States Patent
Dohkoshi et al.

(10) Patent No.: US 9,871,264 B2
(45) Date of Patent: Jan. 16, 2018

(54) FUEL CELL SYSTEM

(71) Applicant: Panasonic Intellectual Property Management Co., Ltd., Osaka (JP)

(72) Inventors: Miki Dohkoshi, Osaka (JP); Kunihiro Ukai, Nara (JP); Takehiro Maruyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 222 days.

(21) Appl. No.: 14/794,664

(22) Filed: Jul. 8, 2015

(65) Prior Publication Data

US 2015/0311553 A1  Oct. 29, 2015

Related U.S. Application Data

(63) Continuation of application No. PCT/JP2014/002061, filed on Apr. 10, 2014.

(30) Foreign Application Priority Data

Apr. 16, 2013 (JP) ................................ 2013-085843

(51) Int. Cl.
  *H01M 8/06* (2016.01)
  *H01M 8/12* (2016.01)
  (Continued)

(52) U.S. Cl.
  CPC ..... *H01M 8/0675* (2013.01); *H01M 8/04007* (2013.01); *H01M 8/04022* (2013.01);
  (Continued)

(58) Field of Classification Search
  CPC combination set(s) only.
  See application file for complete search history.

(56) References Cited

U.S. PATENT DOCUMENTS 8,178,062 B2    5/2012  Fuju et al.
9,461,328 B1 *  10/2016  Lines .................... H01M 8/04
(Continued)

FOREIGN PATENT DOCUMENTS

JP    2002179406 A    6/2002
JP    2004217448 A    8/2004
(Continued)

OTHER PUBLICATIONS

International Search Report of PCT application No. PCT/JP2014/002061 dated Jul. 15, 2014.
(Continued)

*Primary Examiner* — Jonathan G Leong
*Assistant Examiner* — Christopher Domone
(74) *Attorney, Agent, or Firm* — McDermott Will & Emery LLP (57) ABSTRACT

The present invention provides a fuel cell system using combustion heat for an evaporator and a desulfurizer effectively. The fuel cell system comprises a combustor, a reformer, a fuel cell, a first cathode air heating part, a desulfurizer and an evaporator. A mixture of oxygen and gas which is contained in fuel is combusted in the combustor. A combustion exhaust gas generated in the combustor flows in the fuel cell system in such a manner that the combustion exhaust gas gives thermal energy to the reformer, the first cathode air heating part, the desulfurizer, and the evaporator in this order.

18 Claims, 8 Drawing Sheets

(51) Int. Cl.
 *H01M 8/04* (2016.01)
 *H01M 8/0662* (2016.01)
 *H01M 8/0612* (2016.01)
 *H01M 8/04014* (2016.01)
 *H01M 8/04007* (2016.01)
 *H01M 8/1246* (2016.01)
 *H01M 8/124* (2016.01)

(52) U.S. Cl.
 CPC ..... *H01M 8/04074* (2013.01); *H01M 8/0618* (2013.01); *H01M 8/0631* (2013.01); *H01M 8/1246* (2013.01); *H01M 2008/1293* (2013.01); *H01M 2300/0074* (2013.01)

(56) References Cited

U.S. PATENT DOCUMENTS

2007/0028522 A1  2/2007  Mizusawa et al.
2009/0087705 A1  4/2009  Fuju et al.
2009/0239121 A1  9/2009  Ono
2012/0086138 A1  4/2012  Taguchi et al.

FOREIGN PATENT DOCUMENTS

| | | |
|---|---|---|
| JP | 2006-351293 | 12/2006 |
| JP | 2008-108722 | 5/2008 |
| JP | 2009-078954 A | 4/2009 |
| JP | 2009-087586 | 4/2009 |
| JP | 2011-216308 | 10/2011 |
| JP | 2012-052787 | 3/2012 |
| JP | 2012-155978 | 8/2012 |
| WO | 2010/150801 | 12/2010 |

OTHER PUBLICATIONS

Extended European Search Report issued in European Patent Application No. 14784717,2, dated Jan. 18, 2016.

\* cited by examiner

PRIOR ART

FIG. 8

FUEL CELL SYSTEM

BACKGROUND

1. Technical Field

The present invention relates to a fuel cell system for generating electric power through a reaction of fuel and oxidation gas (hereinafter, referred to as "electric power generation reaction").

2. Description of the Related Art

Recently, it has been promoted to use a fuel cell as an electric power generation part of a fuel cell distributed electric power generation system, since even a small fuel cell has high electric power generation efficiency. In order to allow the fuel cell to function as an electric power generation part of the distributed electric power generation system, fuel is required to be supplied stably. In a general fuel cell, fuel such as natural gas, city gas, liquefied petroleum gas, gasoline, or kerosene is supplied to generate a reformed gas containing hydrogen through a reforming reaction of water vapor and the fuel with a Ru catalyst or a Ni catalyst under a temperature of 600 degrees Celsius-700 degrees Celsius. The reformed gas is used as fuel of the fuel cell. The reaction heat necessary for the reforming reaction can be obtained, for example, by combusting an anode off-gas which has not been used in the anode of the fuel cell.

Figure 8:
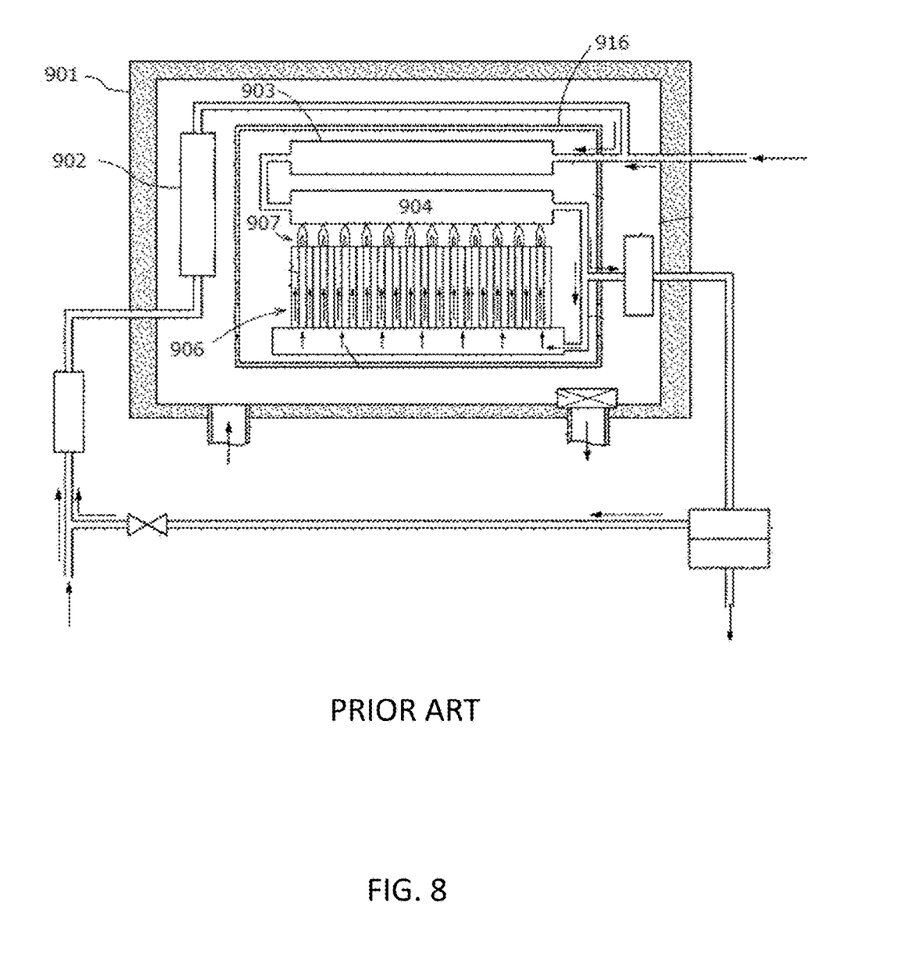
FIG. 8 shows a schematic view of the fuel cell system disclosed in Japanese Patent Application Laid-open Publication No. 2011-216308A.

In order to improve electric power generation efficiency of a fuel cell system, it is required to improve the usage efficiency of the fuel and to use exhaust heat exhausted in the operation of the fuel cell with economy. A solid oxide fuel cell comprises stacks each of which is operated under a high temperature of 650 degrees Celsius-900 degrees Celsius. In order to improve the electric power generation efficiency of the solid oxide fuel cell, it is important to effectively use the exhaust heat generated in the operation of the fuel cell. As shown in FIG. 8, Japanese Patent Application Laid-open Publication No. 2011-216308A discloses a solid oxide fuel cell system comprising an evaporator 903, a desulfurizer 902, a reformer 904, a fuel cell part 906, and a combustor 907 in a heat-insulative housing 901. An inner housing 916 contained in the heat-insulative housing 901 contains the evaporator 903, the reformer 904, the fuel cell part 906, and the combustor 907. In the solid oxide fuel cell system disclosed in Japanese Patent Application Laid-open Publication No. 2011-216308A, an anode off-gas is combusted at the combustor 907 to heat the evaporator 903 and the reformer 904 using the combustion heat thus obtained. The combustion heat transfers to the desulfurizer 902 provided outside of the inner housing 916, and the desulfurizer 902 is heated by the combustion heat thus transferred.

SUMMARY

In the solid oxide fuel cell system disclosed in Japanese Patent Application Laid-open Publication No. 2011-216308A, the combustion heat generated in the combustor 907 is used as a heat source of the evaporator 903 to heat the evaporator 903. Subsequently, the combustion heat transfers through the inner housing 916 to heat the desulfurizer 902. The desulfurizer 902 operates at a higher temperature than the evaporator 903. For this reason, when the desulfurizer 902 is heated with the combustion heat so as to set the operation temperature of the desulfurizer 902 to a predetermined operation temperature, the evaporator 903 is heated at a temperature much higher than a suitable temperature for the evaporator 903, although the evaporator 903 can operate at a temperature much lower than a temperature suitable for the desulfurizer 902. In other words, the combustion heat having an excess high temperature is supplied to the evaporator 903.

An object of the present invention is to provide a fuel cell system using combustion heat for an evaporator and a desulfurizer effectively.

The present invention is a fuel cell system comprising:

a combustor where a mixture of oxygen and gas which is contained in fuel is combusted;

a reformer for generating a reformed gas to be used as the fuel through a reforming reaction from a supplied fuel using a combustion exhaust gas generated in the combustor as a heat source;

a fuel cell for generating electric power through a reaction of the reformed gas and an oxidation gas;

a first cathode air heating part for heating the oxidation gas to be supplied to the fuel cell using the combustion exhaust gas which has heated the reformer as a heat source;

a desulfurizer for removing a sulfur ingredient contained in the fuel to be supplied to the reformer using the combustion exhaust gas which has heated the first cathode air heating part as a heat source; and an evaporator for generating water vapor to be supplied to the reformer by evaporating a supplied water using the combustion exhaust gas which has heated the desulfurizer as a heat source.

The present invention provides a fuel cell system using combustion heat for an evaporator and a desulfurizer effectively.

DESCRIPTION OF THE EMBODIMENT

An embodiment of the present invention will be described below with reference to the drawings.

(Configuration of a Fuel Cell System 7)

Figure 1:
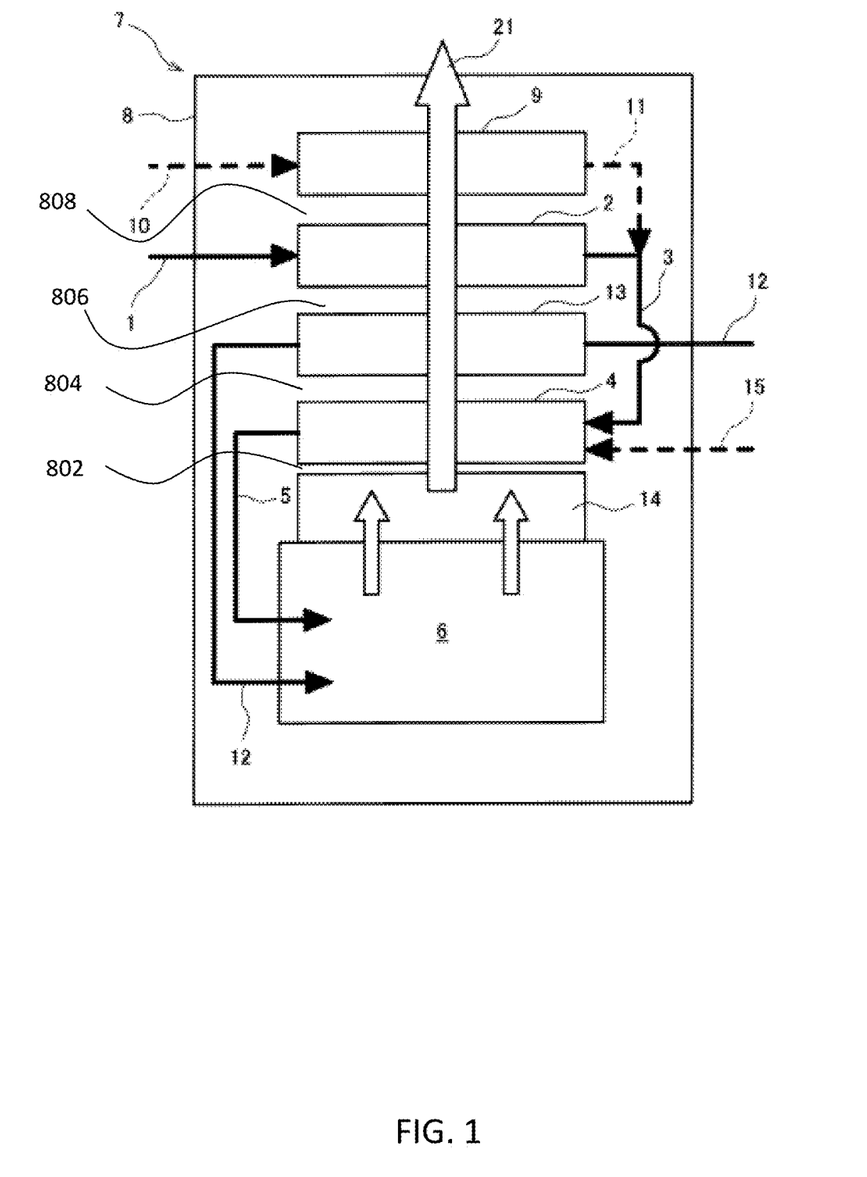
FIG. 1 shows a schematic view of a fuel cell system according to an embodiment.

First, the configuration of the fuel cell system 7 according to the embodiment of the present invention will be described with reference to FIG. 1. FIG. 1 shows a schematic view of the fuel cell system 7 according to the embodiment.

The fuel cell system 7 comprises a fuel cell 6, a combustor 14, a reformer 4, a first cathode air heating part 13, a desulfurizer 2, and an evaporator 9, as shown in FIG. 1. These are disposed in the inside of a housing 8. In other words, the housing 8 contains the fuel cell 6, the combustor 14, the reformer 4, the first cathode air heating part 13, the desulfurizer 2, and the evaporator 9. Desirably, the housing 8 is heat-insulative.

A reformed gas is supplied to the fuel cell 6 as fuel from the reformer 4 through a reformed gas supply flow channel 5. Air is supplied from the outside of the fuel cell 6 to the fuel cell 6 as an oxidation gas through a cathode air supply flow channel 12. The fuel cell 6 generates electric power through a reaction of the reformed gas and the oxidation gas, both of which have thus supplied. The air supplied to the cathode may be referred to as a cathode air or an air for electric power generation. The fuel cell 6 comprises a plurality of electric cells. Each electric cell comprises a fuel electrode to which the reformed gas is supplied and an air electrode to which the cathode air is supplied. The fuel electrode and the air electrode are referred to as an anode and a cathode, respectively. A cell stack is formed in the fuel cell 6 by connecting the plurality of these electric cells in series.

An example of the fuel cell 6 is a solid oxide fuel cell (hereinafter, referred to as "SOFC") or a molten carbonate fuel cell (hereinafter, referred to as "MCFC"). The fuel cell 6 is heated to 550 degrees Celsius-1,000 degrees Celsius in operation. In light of effective usage of the exhaust heat such as combustion heat, it is desirable that the fuel cell 6 is a fuel cell which operates in a middle or high temperature and generates a large amount of the exhaust heat.

An example of the combustor 14 is a burner used to combust an unreacted reformed gas (hereinafter, referred to as "anode off-gas") which has not been consumed in the fuel cell 6 with an unreacted air (hereinafter, referred to as "cathode off-gas") which has not been consumed in the fuel cell 6. This burner may be configured to combust the gaseous mixture of the anode off-gas and the cathode off-gas in such a manner that flame is formed directly at the anode off-gas outlet (not shown) of the fuel cell 6. The fuel which will be described later may be supplied to the combustor 14 in place of or together with the anode off-gas. Similarly, in place of the cathode off-gas, air may be supplied from the outside of the fuel cell 6 without going through the fuel cell 6. A gaseous mixture of the air supplied from the outside of the fuel cell 6 without going through the fuel cell 6 and the cathode off-gas may be supplied to the combustor 14.

The desulfurizer 2 comprises a desulfurization agent. The desulfurization agent removes a sulfur ingredient contained in the fuel supplied through a source gas supply flow channel 1 from the outside of the fuel cell system 7. For example, a hydrodesulfurizer for removing the sulfur ingredient contained in the fuel by a hydrodesulfurization method may be employed as such a desulfurizer 2. The fuel from which the sulfur ingredient has been removed in the desulfurizer 2 is supplied to the reformer 4 through a desulfurized source gas flow channel 3.

An example of the desulfurization agent used for the desulfurizer 2 may be mixture of a Co—Mo based catalyst and zinc oxide. The desulfurization agent is not limited in particular, as far as the fuel is desulfurized by a hydrodesulfurization method.

The hydrodesulfurization method needs hydrogen. For this reason, although not shown in FIG. 1, a part of the reformed gas produced in the reformer 4 is led to the upper steam of the desulfurizer 2 to add the part of the reformed gas to the fuel to be supplied to the desulfurizer 2.

The desulfurization agent has an active temperature range. For example, the active temperature range in the hydrodesulfurization method is not less than approximately 350 degrees Celsius and not more than approximately 400 degrees Celsius. For this reason, in order to remove the sulfur ingredient stably, the desulfurizer 2 is required to be heated in such a manner that the temperature of the desulfurizer 2 falls within this active temperature range. In the fuel cell system 7 according to the embodiment of the present invention, the combustion exhaust gas generated thus in the combustor 14 is used as the heat source to heat the desulfurizer 2. In other words, the desulfurizer 2 is heated with the thermal energy included in this combustion exhaust gas. The thermal energy included in the combustion exhaust gas includes not only the thermal energy obtained in the combustor 14 but also the thermal energy generated in the fuel cell 6 through the electric power generation reaction.

The evaporator 9 is a steam generation device for evaporating the water supplied through a water supply flow channel 10. The combustion exhaust gas generated in the combustor 14 is used as the heat source to heat the evaporator 9. As a result, water is evaporated in the evaporator 9. In other words, the evaporator 9 is heated using the thermal energy included in the combustion exhaust gas to evaporate the water. The steam generated in the evaporator 9 is added through a steam flow channel 11 to the desulfurized fuel flowing through the desulfurized source gas flow channel 3. In this way, the desulfurized fuel to which the steam has been added is supplied to the reformer 4.

The reformer 4 contains a reforming catalyst. In the reformer 4, a reformed gas containing hydrogen is produced through a reforming reaction of the desulfurized fuels and the water vapor. The reforming reaction which occurs in the reformer 4 is an endothermic reaction. For this reason, in order to progress this reforming reaction, the reformer 4 is required to be heated so as to maintain the temperature of the reformer 4 at a predetermined temperature. In the present embodiment, the combustion exhaust gas generated thus in the combustor 14 is used as the heat source to heat the reformer 4. In this way, the reformed gas is produced. In other words, the reformer 4 is heated using the thermal energy included in the combustion exhaust gas to produce the reformed gas. The reformed gas produced in the reformer 4 is supplied to the anode of the fuel cell 6 through a reformed gas supply flow channel 5.

Air is supplied to the reformer 4 through an air supply flow channel 15. At the time of the startup of the fuel cell system 7, the reformer 4 does not have thermal energy sufficient for the steam reforming reaction, which is an endothermic reaction. For this reason, at the time of the startup of the fuel cell system 7, air supplied to the reformer 4 through the air supply flow channel 15 is used to produce the reformed gas through a partial oxidation reforming reaction without supplying water to the evaporator 9 through the water supply flow channel 10.

The first cathode air heating part 13 heats air to be supplied through the cathode air supply flow channel 12 to the cathode of the fuel cell 6 (hereinafter, referred to as "cathode air"). In other words, the air supplied through the cathode air supply flow channel 12 to the first cathode air heating part 13 is heated in the first cathode air heating part 13. In the first cathode air heating part 13, heat is exchanged between the combustion exhaust gas generated in the combustor 14 and the cathode air. As just described, the first cathode air heating part 13 is a heat exchanger capable of heating the cathode air.

As described above, the fuel is supplied to the fuel cell system 7 through the source gas supply flow channel 1. Water is supplied to the fuel cell system 7 through the water supply flow channel 10. The cathode air is supplied to the fuel cell system 7 through the cathode air supply flow channel 12. Furthermore, at the time of the startup of the fuel cell system 7, air is supplied through the air supply flow channel 15.

The fuel, the water, and the air including the cathode air are supplied by a fuel supply part, a water supply part, and an air supply part, which are not shown. An example of the fuel supply part and the air supply part is a blower. An example of the water supply part is a water pump.

In the fuel cell system 7, a city gas may be used as the fuel. The fuel of the gas is not limited to a city gas. A gas containing hydrocarbon as a main component such as propane gas may be used. The fuel may be liquid or gaseous. Desirably, it is gaseous. The cathode air means an oxidation gas to be supplied to the cathode. An example of the cathode air is gas containing oxygen such as air.

(Operation of the Fuel Cell System 7)

Next, the operation of the fuel cell system 7 will be described.

First, fuel such as a city gas is supplied to the desulfurizer 2 through the source gas supply flow channel 1. As known well, the city gas may contain an odorant. As described above, a part of the reformed gas produced in the reformer 4 has been added to the city gas. The desulfurizer 2 desulfurizer such fuel through a hydrodesulfurization reaction to remove a sulfur compound which is odorant or a sulfur compound derived from the fuel.

Hereinafter, the hydrodesulfurization reaction will be described by an example of the case where the fuel contains dimethyl sulfide ($C_2H_6S$) as an odorant. Dimethyl sulfide is chemically broken down into zinc sulfide with a formula of ZnS in the desulfurizer 2 through the following two reactions (I) and (II).

$$C_2H_6S+2H_2 \rightarrow 2CH_4+H_2S \qquad (I)$$

$$H_2S+ZnO \rightarrow H_2O+ZnS \qquad (II)$$

The above-described hydrodesulfurization reaction progresses under a temperature range of not less than 350 degrees Celsius and not more than 400 degrees Celsius. The sulfur content contained in the desulfurized fuel is not more than 1 vol ppb (parts per billion). Usually, it is not more than 0.1 vol ppb. Alternatively, dimethyl sulfide may be removed with the desulfurizer such as zeolite through physical adsorption. The desulfurized fuel is supplied to the reformer 4 from the desulfurizer 2 through the desulfurized source gas flow channel 3.

When the fuel is desulfurized in the desulfurizer 2, water supplied through the water supply flow channel 10 is vaporized in the evaporator 9 heated at a temperature of not less than 100 degrees Celsius to produce steam. The steam thus produced flows from the evaporator 9 to the desulfurized source gas flow channel 3. The desulfurized fuel and steam are mixed in the desulfurized source gas flow channel 3, and this mixture is supplied to the reformer 4. A target value of the ratio of the supplied steam to the carbon number in the fuel, namely, the ratio of steam/carbon (hereinafter, referred to as "S/C"), is 2.5.

The reformer 4 is heated in such a manner that the temperature of the reforming catalyst provided therein is not less than 600 degrees Celsius. The reformer 4 produces the reformed gas from the steam and fuel supplied to the reformer 4 through the steam reforming reaction. The reformed gas thus produced is supplied to the fuel cell 6 through the reformed gas supply flow channel 5.

The first cathode air heating part 13 heats the cathode air supplied through the cathode air supply flow channel 12 from the outside to 400 degrees Celsius-650 degrees Celsius. The cathode air heated in this way is supplied to the fuel cell 6.

The fuel cell 6 generates electric power through the reaction of the reformed gas supplied from the reformer 4 and the cathode air supplied from the first cathode air heating part 13. In the present embodiment, since the fuel cell 6 is a solid oxide fuel cell, the solid oxide fuel cell is maintained at the temperature range of not less than approximately 600 degrees Celsius and not more than approximately 900 degrees Celsius in the operation. An unreacted anode gas which has not been used in the fuel cell 6 is combusted in the combustor 14 together with an unreacted cathode air which has not been used in the fuel cell 6 to generate the combustion exhaust gas. Hereinafter, the unreacted anode gas and the unreacted cathode air are referred to as an anode off-gas and a cathode off-gas, respectively.

The fuel cell system 7 according to the present embodiment is configured to heat the reformer 4, the first cathode air heating part 13, the desulfurizer 2, and the evaporator 9 in this order using the combustion exhaust gas generated in the combustor 14 as the heat source. The fuel cell system 7 according to the present embodiment is characterized by the placement of the reformer 4, the first cathode air heating part 13, the desulfurizer 2, and the evaporator 9. The placement allows these four devices to be heated efficiently. Specifically, the reformer 4, the first cathode air heating part 13, the desulfurizer 2, and the evaporator 9 are disposed in this order along a heat transfer direction 21 of the combustion exhaust gas from the combustor 14 in such a manner that the combustion exhaust gas flows from the device which operates at a higher temperature to the device which operates at a lower temperature in the operation of the fuel cell 6. In other words, the fuel cell 6, the combustor 14, the reformer 4, the first cathode air heating part 13, the desulfurizer 2, and the evaporator 9 are disposed in this order from the lower part to the upper part of the fuel cell system 7. In this way, the thermal energy of the combustion exhaust gas generated in the combustor 14 is used in a cascade way. The characteristic will be described below in more detail.

(Placement of the Four Devices Included in the Fuel Cell System 7)

The reformer 4 operates at a temperature of not less than approximately 550 degrees Celsius and not more than approximately 650 degrees Celsius. The first cathode air heating part 13 is heated to not less than approximately 400 degrees Celsius and not more than approximately 650 degrees Celsius. The desulfurizer 2 operates at a temperature of not less than approximately 350 degrees Celsius and not more than approximately 400 degrees Celsius. The evaporator 9 is heated to not less than approximately 100 degrees Celsius and not more than approximately 350 degrees Celsius. On the other hand, the combustion exhaust gas generated in the combustor 14 has a temperature of not less than approximately 650 degrees Celsius and not more than approximately 820 degrees Celsius.

As indicated by the heat transfer direction 21 of the combustion exhaust gas, in the inside of the housing 8, the fuel cell system 7 according to the present embodiment is configured to give the thermal energy of the combustion exhaust gas to the four devices in the order of the operation temperature from highest to lowest. In other words, the reformer 4, the first cathode air heating part 13, the desulfurizer 2, and the evaporator 9 are disposed in this order along the heat transfer direction 21 in the housing 8. As shown in FIG. 1, the heat transfer direction 21 of the combustion exhaust gas means an upward direction from the fuel cell 6 which is disposed at the bottom of the inside of the housing 8.

Specifically, the combustor 14 is sandwiched between the fuel cell 6 and the reformer 4. The reformer 4 is disposed above the combustor 14. A first space 802 is formed between the combustor 14 and the reformer 4. The combustion exhaust gas generated in the combustor 14 heats the reformer 4 through the first space 802 and the lateral side of the reformer 4. Heat is changed between the combustion exhaust gas and the reformer 4 to heat the reformer 4. For this reason, the temperature of the combustion exhaust gas is decreased somewhat. The reformer 4 reforms the fuel to produce the reformed gas using the heat given from the combustion exhaust gas to the reformer 4. The combustion exhaust gas goes to the first cathode air heating part 13 through the lateral side of the reformer 4.

The first cathode air heating part 13 is interposed between the reformer 4 and the desulfurizer 2. The first cathode air heating part 13 is disposed above the reformer 4. A second space 804 is formed between the reformer 4 and the first cathode air heating part 13. The combustion exhaust gas which has given a part of the heat thereof to the reformer 4 heats the first cathode air heating part 13 through the second space 804 and the lateral side of the first cathode air heating part 13. Heat is changed between the combustion exhaust gas and the first cathode air heating part 13 to heat the first cathode air heating part 13. For this reason, the temperature of the combustion exhaust gas is decreased somewhat. The cathode air is heated in the first cathode air heating part 13 using the heat given to the first cathode air heating part 13 from the combustion exhaust gas. The combustion exhaust gas goes to the desulfurizer 2 through the lateral side of the first cathode air heating part 13.

The desulfurizer 2 is interposed between the first cathode air heating part 13 and the evaporator 9. The desulfurizer 2 is disposed above the first cathode air heating part 13. A third space 806 is formed between the first cathode air heating part 13 and the desulfurizer 2. The combustion exhaust gas which has given a part of the heat thereof to the reformer 4 and the first cathode air heating part 13 heats the desulfurizer 2 through the third space 806 and the lateral side of the desulfurizer 2. Heat is changed between this combustion exhaust gas and the desulfurizer 2 to heat the desulfurizer 2. For this reason, the temperature of the combustion exhaust gas is decreased somewhat. The desulfurizer 2 desulfurizes the fuel using the heat given to the desulfurizer 2 from the combustion exhaust gas. The combustion exhaust gas goes to the evaporator 9 through the lateral side of the desulfurizer 2.

The evaporator 9 is sandwiched between the desulfurizer 2 and the upper parts of the housing 8. The evaporator 9 is disposed above the desulfurizer 2. A fourth space 808 is formed between the desulfurizer 2 and the evaporator 9. The combustion exhaust gas which has given a part of the heat thereof to the reformer 4, the first cathode air heating part 13, and the desulfurizer 2 heats the evaporator 9 through the fourth space 808 and the lateral side of the evaporator 9. Heat is changed between this combustion exhaust gas and the evaporator 9 to heat the evaporator 9. For this reason, the temperature of the combustion exhaust gas is decreased somewhat. The evaporator 9 heats water to produce water vapor using the heat given to the evaporator 9 from the combustion exhaust gas. The first space 802-the fourth space 808 are air spaces.

In this way, these four devices are heated in the order of the reformer 4, the first cathode air heating part 13, the desulfurizer 2, and the evaporator 9 using the combustion exhaust gas as the heat source. The thermal energy of the combustion exhaust gas is used in a cascade way. As just described, since the thermal energy of the combustion exhaust gas is used in a cascade way, the thermal energy of the combustion exhaust gas is utilized effectively. In other words, in the fuel cell system 7 according to the present embodiment, the combustion heat of the combustion exhaust gas, namely the exhaust heat, is used effectively. As a result, a consumption amount of the fuel is reduced to improve the electric power generation efficiency.

The fuel cell 6 produces water simultaneously with the electric power generation reaction. The water produced in this way is contained in the anode off-gas in a vaporization stare. For this reason, the combustion exhaust gas obtained by combusting the anode off-gas contains water vapor. In order to use the water vapor contained in the combustion exhaust gas as water to be supplied to the reformer 4, the fuel cell system 7 according to the present embodiment is configured to recover water through the condensation of the water vapor by cooling the combustion exhaust gas to a predetermined temperature near the dew point.

Specifically, the combustion exhaust gas which has reached the evaporator 9 is led to a condenser (not shown). The water vapor contained in the combustion exhaust gas is condensed in the condenser to recover water. An example of the condenser is a radiator for lowering the temperature of the combustion exhaust gas through the heat exchange between the combustion exhaust gas and air.

In this way, in the fuel cell system 7, the thermal energy of the combustion exhaust gas is used in a cascade way. The water vapor contained in the combustion exhaust gas which has been used in a cascade way is supplied to the evaporator 9 after condensed. The combustion exhaust gas which has reached the evaporator 9 has a much lower temperature than the combustion exhaust gas generated in the combustor 14. Hence, the amount of air used for air cooling required to recover the water with the condenser is decreased, compared to the case where the thermal energy of the combustion exhaust gas is not used in a cascade way.

(First Variation)

Figure 2:
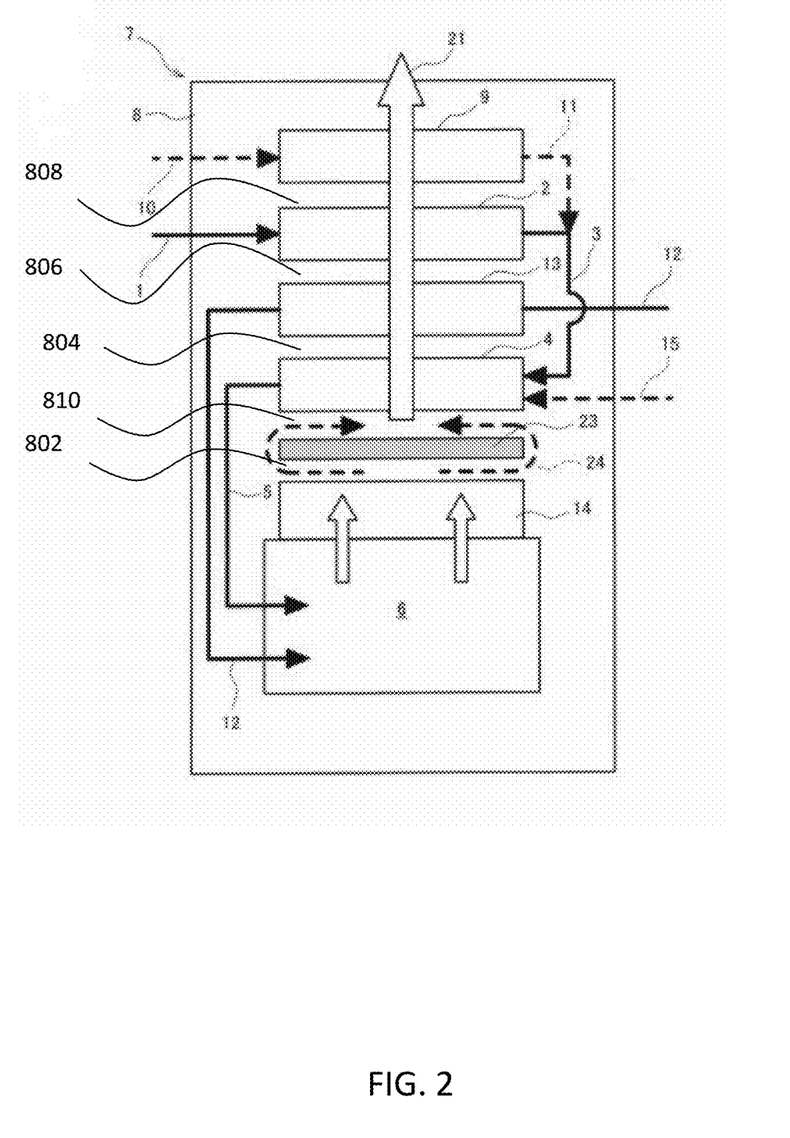
FIG. 2 shows a schematic view of a fuel cell system according to a first variation of the embodiment.

Next, the first variation of the fuel cell system 7 according to the present embodiment will be described with reference to FIG. 2. FIG. 2 shows an example of the fuel cell system 7 according to the first variation of the present embodiment. The fuel cell system 7 according to the first variation has a configuration in which a radiation part 23 provided between the combustor 14 and the reformer 4 is added to the configuration of the fuel cell system 7 according to the above-mentioned present embodiment. The fuel cell system 7 according to the first variation has a configuration similar to the configuration of the fuel cell system 7 according to the above-mentioned present embodiment, except that the radiation part 23 such as a metal plate is added.

The radiation part 23 is interposed between the combustor 14 and the reformer 4, and is heated by the flame formed by the combustor 14. The radiation part 23 gives the heat of the flame as a radiation heat to the reformer 4 which is disposed above the combustor 14. A fifth space 810 is formed between the radiation part 23 and the reformer 4. The fifth space 810 is an air layer. The combustion exhaust gas produced in the combustor 14 flows through the fifth space 810. In other words, the fifth space 810 formed between the radiation part 23 and the reformer 4 functions as an exhaust gas flow channel through which the combustion exhaust gas flows. In order to heat the reformer 4 evenly, it is desirable that the surface shape of the radiation part 23 formed of the metal plate is similar to the surface shape of the part of the reformer 4 opposite to the metal plate.

Since the fuel cell system 7 according to the first variation comprises the radiation part 23, the flame formed by the combustor 14 is prevented from being brought into direct contact with the reformer 4. In other words, the reformer 4 is heated by the radiation heat from the radiation part 23 and by the combustion exhaust gas which flows through the fifth space 810 so as to wrap around the radiation part 23.

As just described, the reformer 4 is prevented from being heated excessively, and the reformer 4 is heated uniformly. In the fuel cell system 7 according to the first variation, since the reformer 4 is heated uniformly to maintain a steady temperature of the reformer 4, the unevenness of the reforming performance of the reformer 4 is decreased, and the reformer 4 is prevented from being deteriorated.

(Second Variation)

Figure 3:
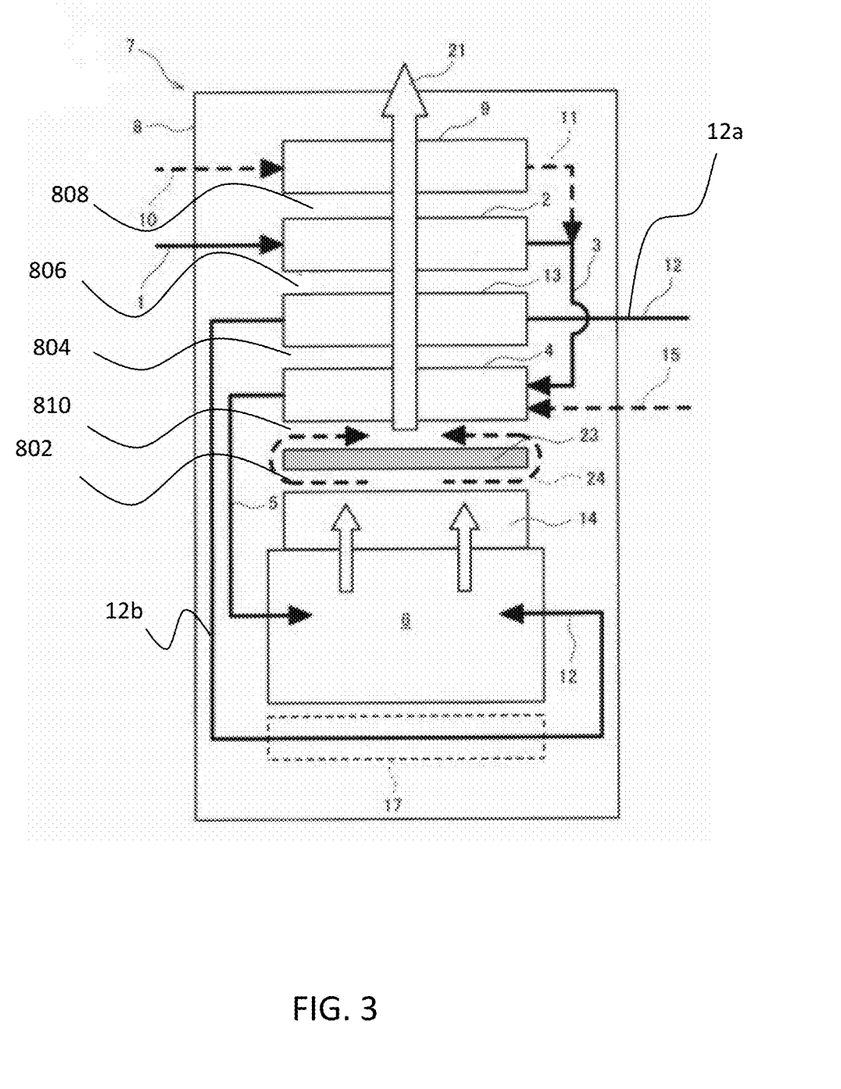
FIG. 3 shows a schematic view of a fuel cell system according to a second variation of the embodiment.

Next, the second variation of the fuel cell system 7 according to the present embodiment will be described with reference to FIG. 3. FIG. 3 shows an example of the fuel cell system 7 according to the second variation of the present embodiment. The cathode air supply flow channel 12 included in the fuel cell system 7 according to the second variation is disposed at at least one of the bottom and lateral side of the fuel cell 6. The cathode air supply flow channel 12 is composed of a first cathode air supply flow channel part 12*a* and a second cathode air supply flow channel part 12*b*. The first cathode air supply flow channel part 12*a* is provided on the upstream of the first cathode air heating part 13. The second cathode air supply flow channel part 12*b* is provided on the downstream of the first cathode air heating part 13. Air is supplied from the outside of the fuel cell system 7 through the first cathode air supply flow channel part 12*a* to the first cathode air heating part 13. The air heated in the first cathode air heating part 13 is supplied through the second cathode air supply flow channel part 12*b* to the fuel cell 6.

The cathode air has a larger flow rate than the reformed gas. For this reason, a large amount of heat is required to raise the temperature of the cathode air from room temperature to a desired temperature. Such a large amount of the heat may cause a problem that the combustion exhaust gas which has given the amount of heat necessary to raise the temperature of the cathode air to the desired temperature to the cathode air fails to have an amount of heat sufficient to give the thermal energy to the desulfurizer 2 and to the evaporator 9.

In order to solve the problem, in the fuel cell system 7 according to the second variation, as shown in FIG. 3, the cathode air heated by the first cathode air heating part 13 is supplied through at least one of the bottom or lateral side of the fuel cell 6 to the fuel cell 6 without supplying the cathode air heated by the first cathode air heating part 13 directly to the fuel cell 6. When the cathode air goes through the at least one of the bottom or lateral side of the fuel cell 6, the cathode air is heated by the heat (desirably, the radiation heat) from the fuel cell 6. In other words, in the fuel cell system 7 according to the second variation, a part of the second cathode air supply flow channel part 12*b*, which is disposed at the at least one of the bottom or lateral side of the fuel cell 6, functions as a second cathode air heating part 17. In FIG. 3, the bottom of the fuel cell 6 is provided with the second cathode air heating part 17.

As just described, a part of the second cathode air supply flow channel part 12*b* functions as the second cathode air heating part 17. Since the cathode air is heated by the heat transferred from the fuel cell 6, the amount of heat necessary for the first cathode air heating part 13 is decreased. In this way, this avoids the shortage of the amount of the heat of the combustion exhaust gas to be given to the desulfurizer 2 and evaporator 9. Since the radiation heat of the fuel cell 6 is used to heat the cathode air, the usage efficiency of the exhaust heat is further improved.

(Third Variation)

Figure 4:
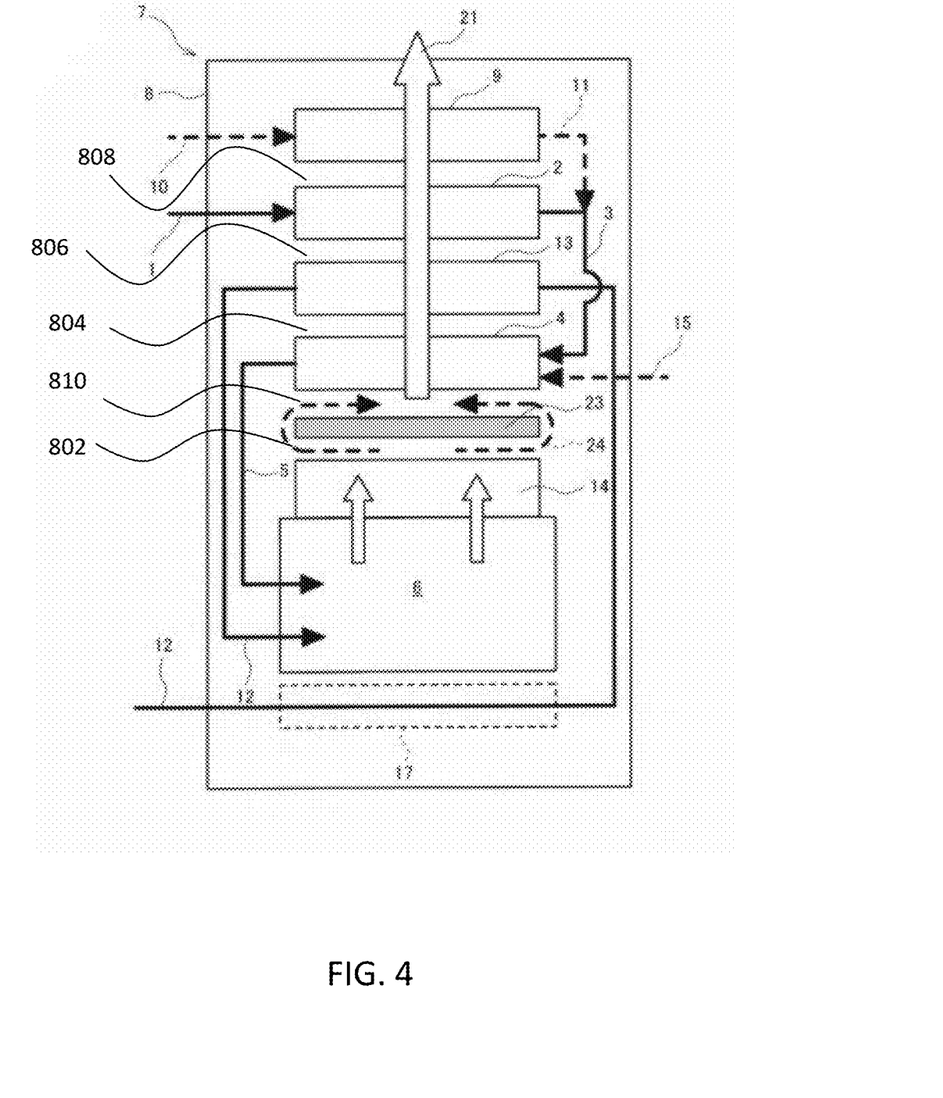
FIG. 4 shows a schematic view of a fuel cell system according to a third variation of the embodiment.

FIG. 4 shows an example of the fuel cell system 7 according to the third variation of the present embodiment. In FIG. 3, the second cathode air supply flow channel part 12*b* is disposed at the bottom of the fuel cell 6 and functions as the second cathode air heating part 17. However, as shown in FIG. 4, a part of the first cathode air supply flow channel part 12*a* is disposed at the at least one of the bottom or lateral side of the fuel cell 6, and can function as the second cathode air heating part 17.

In FIG. 4, before the cathode air is supplied to the first cathode air heating part 13, the cathode air is heated to a predetermined temperature with the heat (desirably, the radiation heat) of the fuel cell 6. Similarly to the case of the second variation shown in FIG. 3, since the cathode air is heated by the radiation heat of the fuel cell 6, the usage efficiency of the exhaust heat is further improved. Furthermore, this avoids the shortage of the amount of heat to be given to the desulfurizer 2 and the evaporator 9 from the combustion exhaust gas.

In the fuel cell systems 7 shown in FIG. 1-FIG. 4, the first space 802 is provided between the combustor 14 and the reformer 4. The second space 804 is provided between the reformer 4 and the first cathode air heating part 13. The third space 806 is formed between the first cathode air heating part 13 and the desulfurizer 2. The fourth space 808 is provided between the desulfurizer 2 and the evaporator 9.

However, the second space 804, the third space 806, and the fourth space 808 do not have to be formed. In other words, the reformer 4, the first cathode air heating part 13, the desulfurizer 2, and the evaporator 9 may be disposed adjacently. In the case where the four devices are disposed adjacently, the thermal energy of the combustion exhaust gas is transferred through these four devices along the heat transfer direction 21 of the combustion exhaust gas.

At least one space selected from the second space 804, the third space 806, and the fourth space 808 may be formed in the fuel cell system 7. The selected space functions as a flow channel through which the combustion exhaust gas flows.

The second space 804, the third space 806, and the fourth space 808 are formed in the fuel cell system 7. At least one space selected from the second space 804, the third space 806, and the fourth space 808 functions as the flow channel through which the combustion exhaust gas flows.

The second space 804, the third space 806, and the fourth space 808 are formed in the fuel cell system 7. These three spaces function as the flow channels through which the combustion exhaust gas flows.

Figure 5:
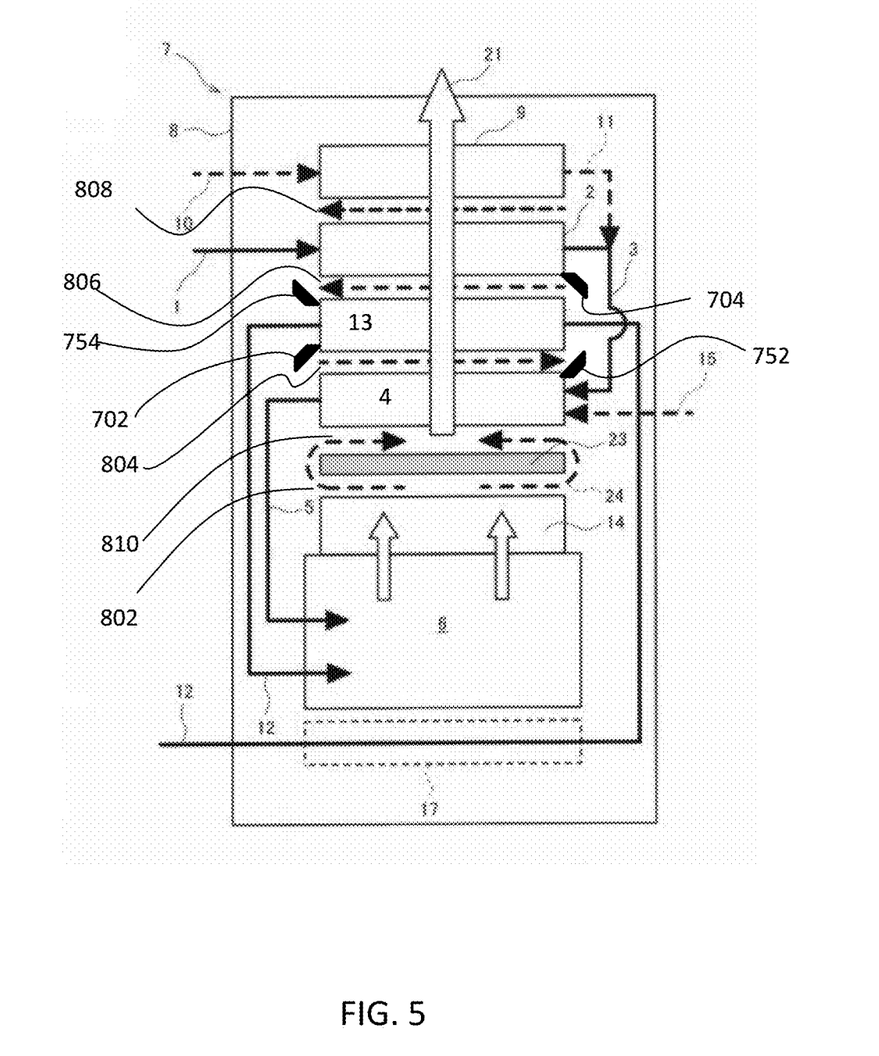
FIG. 5 shows an example of a flow pathway of a combustion exhaust gas in the fuel cell system shown in FIG. 4.

As shown in FIG. 5, it is desirable that the flow direction of the combustion exhaust gas flowing through the second space 804 is opposite to the flow direction of the combustion exhaust gas flowing through the third space 806. In this case, a first exhaust gas introduction guide 702 for leading the combustion exhaust gas flowing through the lateral side of the reformer 4 to the second space 804 is provided at one end of the bottom surface of the first cathode air heating part 13 in a cross sectional view of the fuel cell system 7 which appears when the fuel cell system 7 is cut along a plane including a vertical direction. An example of the first exhaust gas introduction guide 702 is a downwardly-inclined plate, a downwardly-extended tube, or a substrate having a groove extended downwardly. The first exhaust gas introduction guide 702 is inclined or extended downwardly from the one end of the bottom surface of the first cathode air heating part 13. On the other hand, when viewed in the cross-sectional view of the fuel cell system 7, a second exhaust gas introduction guide 704 similar to the first exhaust gas introduction guide 702 is provided at one end of the bottom surface of the desulfurizer 2. In the cross-sectional view of the fuel cell system 7, the first cathode air heating part 13 is interposed between the first exhaust gas introduction guide 702 and the second exhaust gas introduction guide 704.

The combustion exhaust gas flowing upwardly through the lateral side of the reformer 4 is guided to the second space 804 by the first exhaust gas introduction guide 702 which is provided at the one end of the bottom surface of the first cathode air heating part 13. The combustion exhaust gas which has been guided into the second space 804 flows from the one end to the other end under the bottom surface of the first cathode air heating part 13, and is discharged from the second space 804. In FIG. 5, the combustion exhaust gas flows from left to right in the second space 804. The combustion exhaust gas discharged from the second space 804 is guided to the third space 806 by the second exhaust gas introduction guide 704 which is provided at the one end of the desulfurizer 2. The combustion exhaust gas guided into the third space 806 flows from the one end to the other end above the upper surface of the first cathode air heating part 13, and is discharged from the third space 806. In FIG. 5, the combustion exhaust gas flows from right to left in the third space 806. In this way, the flow direction of the combustion exhaust gas flowing through the second space 804 is opposite to the flow direction of the combustion exhaust gas flowing through the third space 806. As a result, efficiency of the heat exchange is improved. Hereinafter, the reason why the efficiency of the heat exchange is improved will be described.

The efficiency of the heat exchange is improved with an increase in a temperature difference. In the present paragraph, the present inventors suppose that the combustion exhaust gas flows from the one end to the other end of the first cathode air heating part 13 both in the second space 804 and in the third space 806. In other words, the flow direction of the combustion exhaust gas flowing through the second space 804 is same as the flow direction of the combustion exhaust gas flowing through the third space 806. Since the heat is exchanged between the combustion exhaust gas flowing through the second space 804 and the first cathode air heating part 13, the combustion exhaust gas flowing through the second space 804 has a higher temperature at the one end than at the other end of the second space 804. Similarly, the combustion exhaust gas flowing through the third space 806 has a higher temperature at the one end than at the other end of the third space 806. As just described, the combustion exhaust gas has a higher temperature at the one end than at the other end both in the second space 804 and in the third space 806. The temperature difference between the combustion exhaust gas flowing through the second space 804 and the combustion exhaust gas flowing through the third space 806 is not much large at the one end or at the other end. Accordingly, the efficiency of the heat exchange is not so high.

On the other hand, in the present paragraph, the present inventors suppose that the combustion exhaust gas flows from the one end to the other end of the first cathode air heating part 13 in the second space 804, however, that the combustion exhaust gas flows from the other end to the one end of the first cathode air heating part 13 in the third space 806. In other words, the present inventors suppose that the flow direction of the combustion exhaust gas flowing through the second space 804 is opposite to the flow direction of the combustion exhaust gas flowing through the third space 806. In the second space 804, the combustion exhaust gas has a higher temperature at the one end and a lower temperature at the other end. On the other hand, in the third space 806, the combustion exhaust gas has a higher temperature at the other end than at the one end. For this reason, at one end, the temperature difference between the combustion exhaust gas flowing through the second space 804 (which has a higher temperature) and the combustion exhaust gas flowing through the third space 806 (which has a lower temperature) is large. Also at the other end, the temperature difference between the combustion exhaust gas flowing through the second space 804 (which has a lower temperature) and the combustion exhaust gas flowing through the third space 806 (which has a higher temperature) is large. Accordingly, the efficiency of the heat exchange is high.

As just described, the efficiency of the heat exchange is improved in the case where the flow direction of the combustion exhaust gas flowing through the second space 804 is opposite to the flow direction of the combustion exhaust gas flowing through the third space 806, compared to the case where the flow direction of the combustion exhaust gas flowing through the second space 804 is same as the flow direction of the combustion exhaust gas flowing through the third space 806.

In FIG. 5, the first exhaust gas introduction guide 702 is provided at the one end of the bottom surface of the first cathode air heating part 13; however, the first exhaust gas introduction guide 702 may be provided at one end of the bottom surface of the desulfurizer 2. In this case, the second exhaust gas introduction guide 704 is provided at one end of the bottom surface of the evaporator 9 in such a manner that the desulfurizer 2 is interposed between the first exhaust gas introduction guide 702 and the second exhaust gas introduction guide 704.

In this case, the flow direction of the combustion exhaust gas flowing through the third space 806 can be opposite to the flow direction of the combustion exhaust gas flowing through the fourth space 808. Also in such a case, the efficiency of the heat exchange is improved.

It is desirable that the other end of the upper surface of the reformer 4 is provided with a first exhaust gas lead-out part 752 for upwardly leading the combustion exhaust gas discharged from the second space 804. An example of the first exhaust gas lead-out part 752 is an upwardly-inclined plate, an upwardly-extended tube, or a substrate having a groove extended upwardly. The first exhaust gas lead-out part 752 is inclined or extended upwardly from the other end of the upper surface of the reformer 4. The first exhaust gas lead-out part 752 allows to the flow direction of the combustion exhaust gas flowing through the second space 804 to be opposite to the flow direction of the combustion exhaust gas flowing through the third space 806 with ease. On the other hand, when viewed in the cross-sectional view of the fuel cell system 7, a second exhaust gas lead-out part 754 similar to the first exhaust gas lead-out part 752 may be provided at the other end of the upper surface of the first cathode air heating part 13. The second exhaust gas lead-out part 754 leads upwardly the combustion exhaust gas discharged from the third space 806.

The first exhaust gas introduction guide 702 may be provided at the one end of the bottom surface of the desulfurizer 2. In this case, the second exhaust gas introduction guide 704 may be provided at the one end of the bottom surface of the evaporator 9 in such a manner that the desulfurizer 2 is interposed between the first exhaust gas introduction guide 702 and the second exhaust gas introduction guide 704. Similarly, the first exhaust gas lead-out part 752 may be provided at one end of the upper surface of the first cathode air heating part 13 in such a manner that the third space 806 is interposed between the first exhaust gas introduction guide 702 and the first exhaust gas lead-out part 752. In this case, the second exhaust gas lead-out part 754 may be provided at one end of the upper surface of the desulfurizer 2.

(Fourth Variation)

Figure 6:
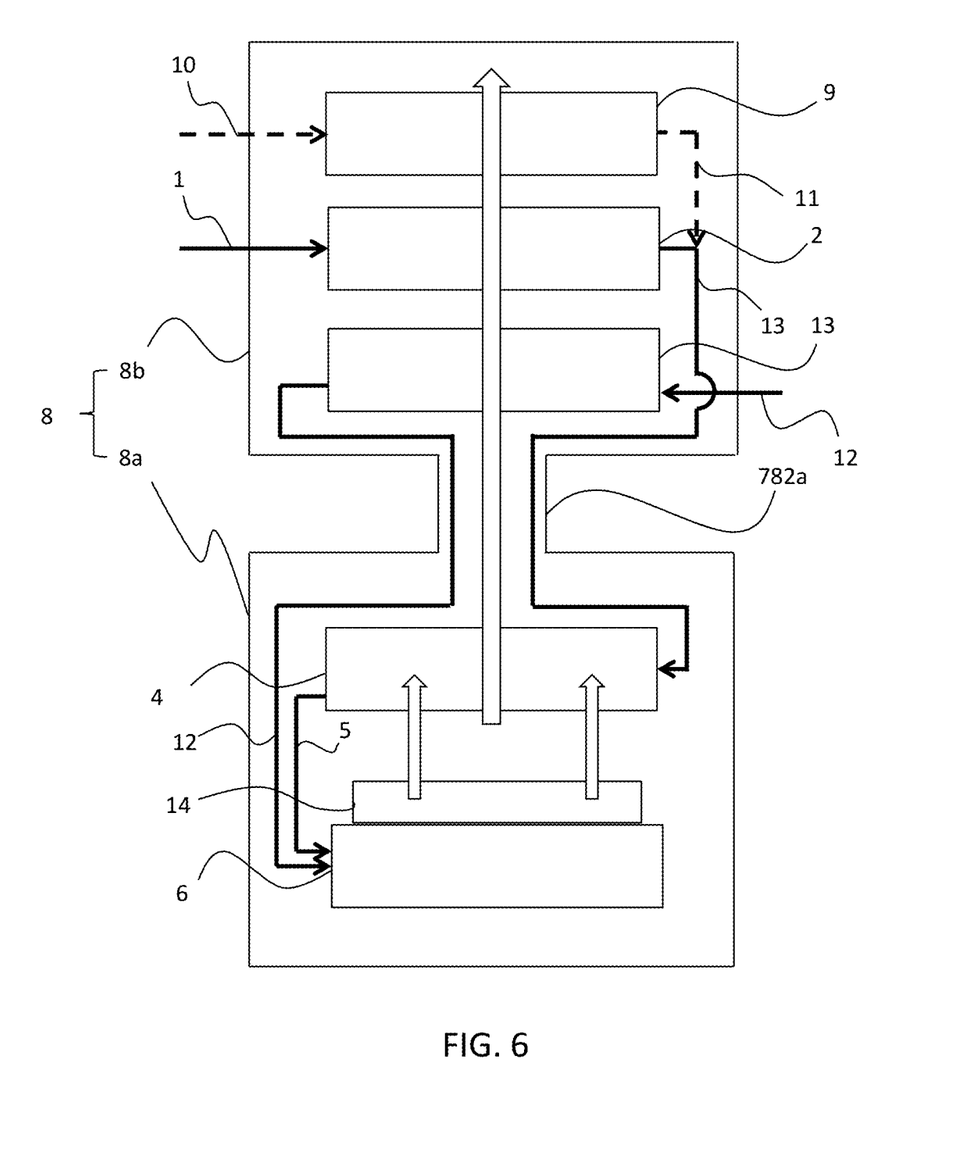
FIG. 6 shows a schematic view of a fuel cell system according to a fourth variation of the embodiment.

FIG. 6 shows an example of the fuel cell system 7 according to the fourth variation of the present embodiment. In FIG. 1-FIG. 5, the housing 8 contains the fuel cell 6, the combustor 14, the reformer 4, the first cathode air heating part 13, the desulfurizer 2, and the evaporator 9. However, the housing 8 may be divided into two or more housing parts, as shown in FIG. 6. In FIG. 6, the housing 8 is divided into a first housing part 8a and a second housing part 8b. In other words, the housing 8 is composed of the first housing part 8a and the second housing part 8b.

The first housing part 8a contains at least the fuel cell 6 and the combustor 14. The second housing part 8b contains at least the evaporator 9. Either the first housing part 8a or the second housing part 8b contains the reformer 4. When the second housing part 8b contains the reformer 4, the second housing part 8b contains the first cathode air heating part 13 and the desulfurizer 2. When the second housing part 8b contains the first cathode air heating part 13, the second housing part 8b contains the desulfurizer 2; however, the first housing part 8a contains the reformer 4. When the first housing part 8a contains the desulfurizer 2, the first housing part 8a contains both the reformer 4 and the first cathode air heating part 13.

In FIG. 6, the first housing part 8a contains the fuel cell 6, the combustor 14, and the reformer 4. The second housing part 8b contains the first cathode air heating part 13, the desulfurizer 2, and the evaporator 9. A first combustion exhaust gas flow channel 782a connects the upper part of the first housing part 8a to the lower part of the second housing part 8b. The combustion exhaust gas which has heated the reformer 4 flows through the first combustion exhaust gas flow channel 782a from the upper part of the first housing part 8a to the lower part of the second housing part 8b.

(Fifth Variation)

Figure 7:
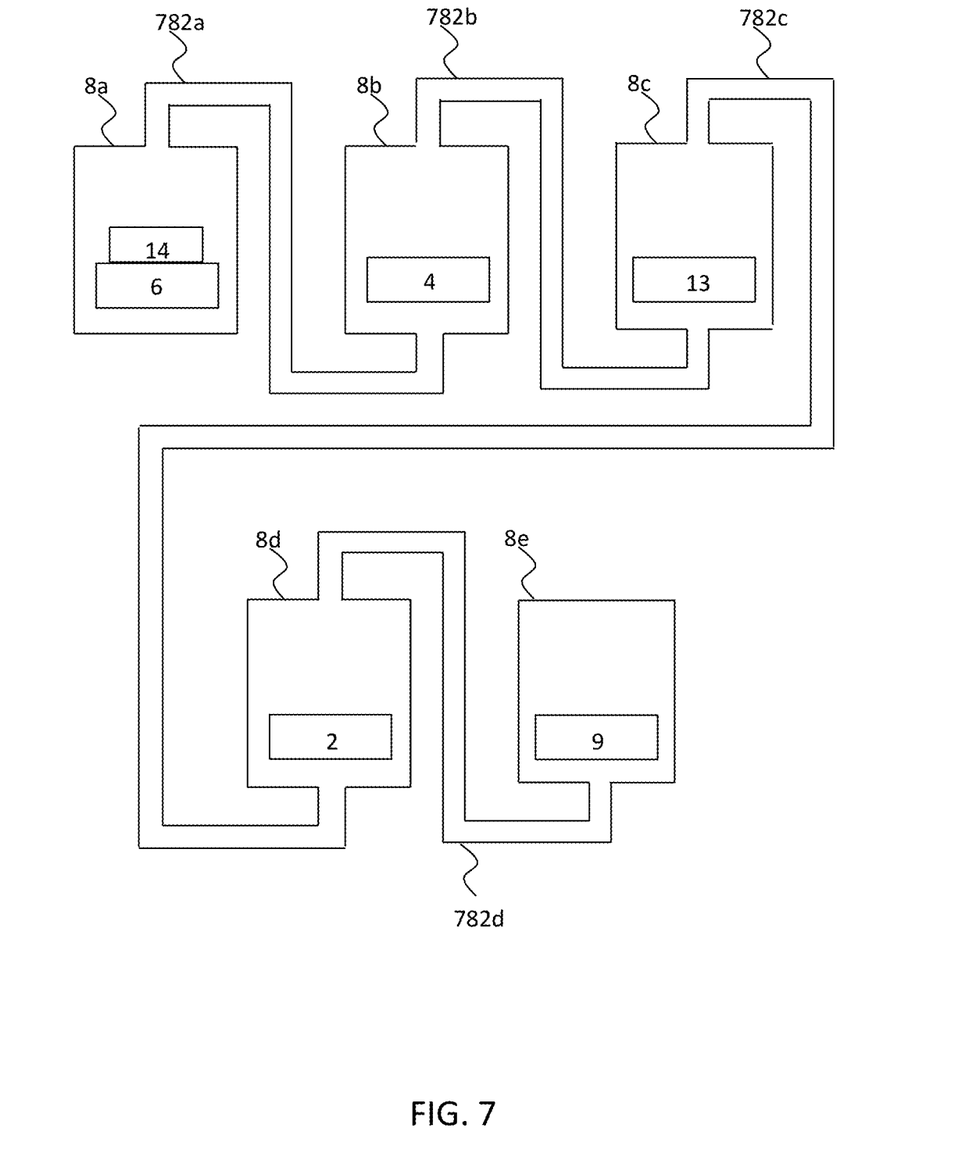
FIG. 7 shows a schematic view of a fuel cell system according to a fifth variation of the embodiment.

FIG. 7 shows an example of the fuel cell system 7 according to the fifth variation of the present embodiment. As shown in FIG. 7, the housing 8 may be divided into five housing parts 8a-8e. In this case, the first housing part 8a contains the fuel cell 6 and the combustor 14. The second housing part 8b, the third housing part 8c, the fourth housing part 8d, and the fifth housing part 8e contain the reformer 4, the first cathode air heating part 13, the desulfurizer 2, and the evaporator 9 respectively. The combustion exhaust gas flows through first-fourth combustion exhaust gas flow channels 782a-782d in this order. In the fourth and fifth variations, it is desirable that the first-fifth housings 8a-8e are heat-insulative.

INDUSTRIAL APPLICABILITY

In the fuel cell system according to the present invention, the combustion heat is effectively used for the evaporator and the desulfurizer to reduce the consumption of the fuel. As a result, compared to a conventional fuel cell system, electric power generation efficiency improves.

REFERENTIAL SIGNS LIST

1 Source gas supply flow channel
2 Desulfurizer
3 Desulfurized source gas flow channel
4 Reformer
5 Reformed gas supply flow channel
6 Fuel cell
7 Fuel cell system
8 Housing
8a First housing
8b Second housing
8c-8e Third-Fifth housing
9 Evaporator
10 Water supply flow channel
11 Steam flow channel
12 Cathode air supply flow channel
13 First cathode air heating part
14 Combustor
15 Air supply flow channel
17 Second cathode air heating part
21 Heat transfer direction of the combustion exhaust gas
23 Radiation part
24 Combustion exhaust gas flow channel
702 First exhaust gas introduction guide
704 Second exhaust gas introduction guide
752 First exhaust gas lead-out part
754 Second exhaust gas lead-out part
782a First combustion exhaust gas flow channel
782b Second combustion exhaust gas flow channel
782c Third combustion exhaust gas flow channel
782d Fourth combustion exhaust gas flow channel
782e Fifth combustion exhaust gas flow channel
802 First space
804 Second space
806 Third space
808 Fourth space

The invention claimed is:

1. A fuel cell system comprising:
a combustor where a mixture of oxygen and gas which is contained in fuel is combusted;
a reformer for generating a reformed gas to be used as the fuel through a reforming reaction from supplied gaseous fuel using a combustion exhaust gas generated in the combustor as a heat source;
a fuel cell for generating electric power through a reaction of the reformed gas and an oxidation gas;
a first cathode air heating part for heating the oxidation gas to be supplied to the fuel cell using the combustion exhaust gas which has heated the reformer as a heat source;
a desulfurizer for removing a sulfur ingredient contained in the fuel to be supplied to the reformer using the combustion exhaust gas which has heated the first cathode air heating part as a heat source; and
an evaporator for generating water vapor to be supplied to the reformer by evaporating a supplied water using the combustion exhaust gas which has heated the desulfurizer as a heat source,
wherein the reformer, the first cathode air heating part, the desulfurizer, and the evaporator are disposed in this order along a heat transfer direction of the combustion exhaust gas from the combustor in such a manner that the combustion exhaust gas flows from a device which operates at a higher temperature to a device which operates at a lower temperature.

2. The fuel cell system according to claim 1, further comprising:
a cathode air supply flow channel through which the oxidation gas to be supplied to the fuel cell through the first cathode air heating part flows, wherein
the cathode air supply flow channel has a second cathode air heating part for heating the oxidation gas flowing through the cathode air supply flow channel using heat generated in the fuel cell.

3. The fuel cell system according to claim 2, wherein
the second cathode air heating part is disposed at a bottom of the fuel cell, and
the cathode air supply flow channel is provided with the second cathode air heating part on an upstream side of the first cathode air heating part.

4. The fuel cell system according to claim 2, wherein
the second cathode air heating part is disposed at a bottom of the fuel cell, and
the cathode air supply flow channel is provided with the second cathode air heating part on a downstream side of the first cathode air heating part.

5. The fuel cell system according to claim 1, further comprising:
a metal plate disposed between the combustor and the reformer, wherein
a space through which the combustion exhaust gas generated in the combustor flows is formed between the metal plate and the reformer.

6. The fuel cell system according to claim 1, wherein
a first space is formed between the combustor and the reformer,
a second space is formed between the reformer and the first cathode air heating part,
a third space is formed between the first cathode air heating part and the desulfurizer,
a fourth space is formed between the desulfurizer and the evaporator, and
at least one space selected from the second space, the third space, and the fourth space functions as a flow channel through which the combustion exhaust gas flows.

7. The fuel cell system according to claim 6, wherein
a direction in which the combustion exhaust gas flows in one space selected from the group consisting of the second space, the third space, and the fourth space is opposite to a direction in which the combustion exhaust gas flows in at least one of the other spaces.

8. The fuel cell system according to claim 7, further comprising:
a first exhaust gas introduction guide for leading the combustion exhaust gas to the second space; and
a second exhaust gas introduction guide for leading the combustion exhaust gas to the third space, wherein
the first exhaust gas introduction guide is provided at one end of the bottom surface of the first cathode air heating part,
the first exhaust gas introduction guide is inclined or extended downwardly from the one end of the bottom surface of the first cathode air heating part,
the second exhaust gas introduction guide is provided at one end of the bottom surface of the desulfurizer in such a manner that the first cathode air heating part is interposed between the first exhaust gas introduction guide and the second exhaust gas introduction guide,
the second exhaust gas introduction guide is inclined or extended downwardly from the one end of the bottom surface of the desulfurizer, and
the direction in which the combustion exhaust gas flows in the second space is opposite to the direction in which the combustion exhaust gas flows in the third space.

9. The fuel cell system according to claim 7, further comprising:
a first exhaust gas introduction guide for leading the combustion exhaust gas to the second space; and
a second exhaust gas introduction guide for leading the combustion exhaust gas to the fourth space, wherein
the first exhaust gas introduction guide is provided at one end of the bottom surface of the first cathode air heating part,
the first exhaust gas introduction guide is inclined or extended downwardly from the one end of the bottom surface of the first cathode air heating part,
the second exhaust gas introduction guide is provided at one end of the bottom surface of the evaporator in such a manner that the first cathode air heating part and the desulfurizer are interposed between the first exhaust gas introduction guide and the second exhaust gas introduction guide,
the second exhaust gas introduction guide is inclined or extended downwardly from the one end of the bottom surface of the evaporator, and
the direction in which the combustion exhaust gas flows in the second space is opposite to the direction in which the combustion exhaust gas flows in the fourth space.

10. The fuel cell system according to claim 8, further comprising:
a first exhaust gas lead-out part for upwardly leading the combustion exhaust gas which has flowed through the second space, wherein
the first exhaust gas lead-out part is provided at one end of an upper surface of the reformer in such a manner that the reformer is interposed between the first exhaust gas lead-out part and the first exhaust gas introduction guide, and
the first exhaust gas lead-out part is inclined or extended upwardly from the one end of the upper surface of the reformer.

11. The fuel cell system according to claim 7, further comprising:
a first exhaust gas introduction guide for leading the combustion exhaust gas to the third space; and
a second exhaust gas introduction guide for leading the combustion exhaust gas to the fourth space, wherein
the first exhaust gas introduction guide is provided at one end of the bottom surface of the desulfurizer,
the first exhaust gas introduction guide is inclined or extended downwardly from the one end of the bottom surface of the desulfurizer,
the second exhaust gas introduction guide is provided at one end of the bottom surface of the evaporator in such a manner that the desulfurizer is interposed between the first exhaust gas introduction guide and the second exhaust gas introduction guide,
the second exhaust gas introduction guide is inclined or extended downwardly from the one end of the bottom surface of the evaporator, and
the direction in which the combustion exhaust gas flows in the third space is opposite to the direction in which the combustion exhaust gas flows in the fourth space.

12. The fuel cell system according to claim 11, further comprising:

a first exhaust gas lead-out part for upwardly leading the combustion exhaust gas which has flowed through the third space, wherein the first exhaust gas lead-out part is provided at one end of an upper surface of the first cathode air heating part in such a manner that the first cathode air heating part is interposed between the first exhaust gas lead-out part and the first exhaust gas introduction guide, and the first exhaust gas lead-out part is inclined or extended upwardly from the one end of the upper surface of the first cathode air heating part.

13. The fuel cell system according to claim 6, further comprising:

a housing, wherein the housing contains the fuel cell, the combustor, the reformer, the first cathode air heating part, the desulfurizer, and the evaporator, the reformer is disposed above the combustor, the first cathode air heating part is disposed above the reformer, the desulfurizer is disposed above the first cathode air heating part, and the evaporator is disposed above the desulfurizer.

14. The fuel cell system according to claim 1, further comprising:

a first housing part;

a second housing part; and an exhaust gas flow channel, wherein the first housing part contains the fuel cell and the combustor, the second housing part contains the evaporator, and the exhaust gas flow channel connects the first housing part to the second housing part.

15. The fuel cell system according to claim 1, wherein the reformer operates under a temperature of not less than approximately 550 degrees Celsius and not more than approximately 650 degrees Celsius, the first cathode air heating part is heated to not less than approximately 400 degrees Celsius and not more than approximately 650 degrees Celsius, the desulfurizer operates under a temperature of not less than approximately 350 degrees Celsius and not more than approximately 400 degrees Celsius, and the evaporator is heated to not less than approximately 100 degrees Celsius and not more than approximately 350 degrees Celsius.

16. The fuel cell system according to claim 1, wherein the fuel cell comprises a cathode, an anode, and an electrolyte membrane, and the electrolyte membrane is made of a solid oxide.

17. The fuel cell system according to claim 16, wherein the mixture contains oxygen which has not reacted in the cathode.

18. The fuel cell system according to claim 16, wherein the mixture contains the fuel which has not reacted in the anode.

\* \* \* \* \*